US012671758B2

(12) United States Patent
Lim et al.

(10) Patent No.: US 12,671,758 B2
(45) Date of Patent: Jun. 30, 2026

(54) DISPLAY ASSEMBLY WITH MULTI-SEGMENT FLEX

(71) Applicant: Google LLC, Mountain View, CA (US)

(72) Inventors: Yongho Lim, Chicago, IL (US); Michael J. Lombardi, South Barrington, IL (US); Joseph Allore, Mundelein, IL (US); Tyler J. Ewing, San Francisco, CA (US); Michael E. Bentz, Chicago, IL (US); Avi Pinchas Hecht, San Francisco, CA (US)

(73) Assignee: Google LLC, Mountain View, CA (US)

( * ) Notice: Subject to any disclaimer, the term of this patent is extended or adjusted under 35 U.S.C. 154(b) by 306 days.

(21) Appl. No.: 18/540,474

(22) Filed: Dec. 14, 2023

(65) Prior Publication Data

US 2025/0203002 A1     Jun. 19, 2025

(51) Int. Cl.
*H04M 1/02*         (2006.01)

(52) U.S. Cl.
CPC ....... *H04M 1/0277* (2013.01); *H04M 1/0216* (2013.01); *H04M 1/0262* (2013.01); *H04M 1/0268* (2013.01)

(58) Field of Classification Search
CPC ............. H04M 1/0277; H04M 1/0268; H04M 1/0216; H04M 1/0266; G06F 1/1616; G06F 1/1641; G06F 1/1652; G06F 1/1681; G06F 1/1683; H05K 5/0018; H05K 5/0226
See application file for complete search history.

(56) References Cited

U.S. PATENT DOCUMENTS

| | | | | |
|---|---|---|---|---|
| 10,748,981 | B1 * | 8/2020 | Rieutort-Louis .... | H10K 59/131 |
| 10,917,973 | B1 | 2/2021 | Pun et al. | |
| 2012/0287587 | A1 * | 11/2012 | Los ..................... | G06F 3/03547 |
| | | | | 361/749 |
| 2018/0198089 | A1 * | 7/2018 | Kim ................... | H10K 59/8792 |
| 2019/0097339 | A1 * | 3/2019 | Lim ..................... | H01R 12/772 |
| 2019/0196548 | A1 * | 6/2019 | Kim ...................... | G06F 1/1681 |
| 2019/0200466 | A1 * | 6/2019 | Kim ...................... | G06F 1/1656 |
| 2021/0247806 | A1 * | 8/2021 | Lee ....................... | G06F 1/1683 |
| 2021/0248932 | A1 * | 8/2021 | Li ......................... | G06F 1/1641 |
| 2022/0272832 | A1 | 8/2022 | Gong et al. | |
| 2023/0080404 | A1 * | 3/2023 | Cui .......................... | G09F 9/30 |
| | | | | 361/807 |

(Continued)

FOREIGN PATENT DOCUMENTS

| | | |
|---|---|---|
| KR | 100661297 B1 | 12/2006 |
| KR | 20070007420 A | 1/2007 |
| KR | 20190054500 A | 5/2019 |

*Primary Examiner* — Cindy Trandai
(74) *Attorney, Agent, or Firm* — Shumaker & Sieffert, P.A.

(57) ABSTRACT

An example mobile computing device includes a display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel; first circuit components mounted to the first rigid circuit board; a second rigid circuit board connected to a second end of the first rigid circuit board via a second flexible printed circuit connection, the second rigid circuit board folded over the first rigid circuit board; and second circuit components mounted to the second rigid circuit board.

13 Claims, 7 Drawing Sheets

(56)     References Cited

U.S. PATENT DOCUMENTS

| | | | |
|---|---|---|---|
| 2023/0096714 A1* | 3/2023 | Bae | G09F 9/301 |
| | | | 361/679.27 |
| 2023/0245606 A1* | 8/2023 | Kim | G09G 3/006 |
| | | | 324/537 |
| 2023/0288962 A1* | 9/2023 | Kwak | H04M 1/0237 |
| 2023/0413427 A1* | 12/2023 | Jeong | G06F 1/1658 |
| 2023/0418328 A1* | 12/2023 | Huh | H01Q 1/243 |
| 2024/0015236 A1* | 1/2024 | Tang | H04M 1/0214 |
| 2024/0040023 A1* | 2/2024 | Wang | H04M 1/0237 |
| 2024/0072416 A1* | 2/2024 | Hwang | H04M 1/026 |
| 2024/0206137 A1* | 6/2024 | Jung | H05K 7/20963 |
| 2024/0206305 A1* | 6/2024 | Kim | H10K 59/90 |
| 2024/0259489 A1* | 8/2024 | Jeong | H04M 1/0268 |
| 2024/0306480 A1* | 9/2024 | Lee | H10K 59/8793 |

* cited by examiner

DISPLAY ASSEMBLY WITH MULTI-SEGMENT FLEX

BACKGROUND

Mobile computing devices may include one or more display assemblies. A display assembly of a mobile computing device may include emissive elements (e.g., pixels) and a circuit board that folds over behind the emissive elements. This folded circuit board may be referred to as a display flex. By folding the display flex behind the emissive elements, an area of the display assembly may be reduced at a cost of increased thickness.

SUMMARY

In general, aspects of this disclosure are directed to a display flex that includes multiple foldable segments. Volume within a mobile computing device may be at a significant premium, with many competing interests vying for space. For instance, it may be desirable to restrict a width, depth, and a height of a mobile computing device in order to make the mobile computing device able to be comfortably held by a user and/or fit in a pocket of a user. However, restricting the width, depth, and heigh may reduce a volume available for a battery of the device. As battery capacity may be proportional to battery volume, such reduction may reduce a capacity of the battery of the mobile computing device. As such, it may be desirable to increase a volume available for the battery without unduly increasing a width, depth, or a height of the mobile computing device.

In accordance with one or more aspects of this disclosure, a display assembly may include a display flex that includes multiple foldable segments. The multiple foldable segments may be folded back over each other, thereby reducing width and height dimensions of the display flex in exchange for an increase in depth of the display flex. This reduction in display flex width and height may "free-up" additional space for other components of a mobile computing device, such as a larger battery. In particular, because batteries generally have consistent depth (i.e., thickness), having a display flex with multiple stacked folded segments may enable an increase in size of a consistent depth space for the battery. In designs where volume above the display flex was unoccupied (or occupied by components that may be moved elsewhere), aspects of this disclosure may enable an increase in battery size, and therefore capacity, without unduly increasing a width, depth, or a height of the mobile computing device.

An example mobile computing device includes a display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel: first circuit components mounted to the first rigid circuit board: a second rigid circuit board connected to a second end of the first rigid circuit board via a second flexible printed circuit connection, the second rigid circuit board folded over the first rigid circuit board; and second circuit components mounted to the second rigid circuit board.

An example display assembly includes: a display panel that includes light emitting elements; and a display flex comprising: a first rigid circuit board connected to the display panel via a first flexible printed circuit connection at a first end of the first rigid circuit board, the first rigid circuit board folded over the display panel: first circuit components mounted to the first rigid circuit board: a second rigid circuit board connected to a second end of the first rigid circuit board via a second flexible printed circuit connection, the second rigid circuit board folded over the first rigid circuit board; and second circuit components mounted to the second rigid circuit board.

The details of one or more examples are set forth in the accompanying drawings and the description below. Other features, objects, and advantages of the disclosure will be apparent from the description and drawings, and from the claims.

DETAILED DESCRIPTION

Figure 1A:
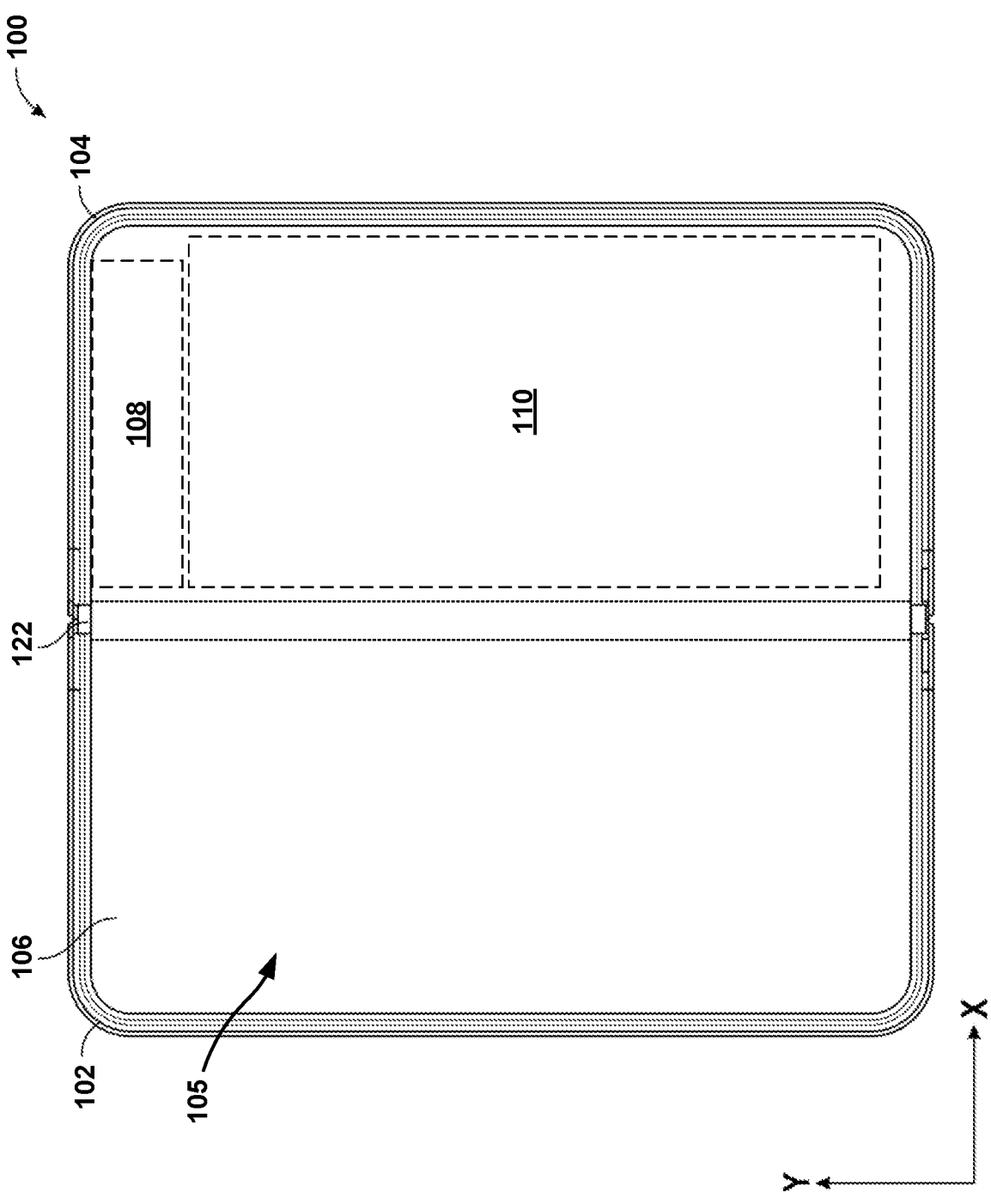
FIGS. 1A and 1B are schematic diagrams illustrating a folding device 100 with a flexible continuous display, in accordance with one or more aspects of this disclosure.
Figure 1B:

FIGS. 1A and 1B are schematic diagrams illustrating a folding device 100 with a flexible continuous display, in accordance with one or more aspects of this disclosure. Examples of device 100 include foldable mobile computing devices such as foldable smart phones, foldable tablets, foldable e-readers, foldable gaming systems, or any other foldable portable device that includes a display.

As shown in FIGS. 1A and 1B, device 100 includes a first assembly 102, second assembly 104, continuous display 106, and hinge assembly 122. Each of first assembly 102 and second assembly 104 may include an inner surface and an outer surface. The outer surface of first assembly 102 may be visible when looking down at device 100 in the z-axis and the outer surface of second assembly 104 may be visible when looking up at device 100 in the z-axis. The inner surfaces of first assembly 102 and second assembly 104 may not be externally visible when device 100 is closed. As further shown in FIG. 1A, when folding device 100 is fully open, an inner surface of a first assembly 102 is coplanar with an inner surface of a second assembly 104. FIG. 1B shows folding device 100 as fully closed.

Computing and/or electrical components of device 100 may be distributed amongst first assembly 102 and second assembly 104. For example, first assembly 102 may include a main logic board and second assembly 104 may include a battery, such as battery 110. This is merely one example arrangement of components amongst first assembly 102 and/or second assembly 104: other arrangements are possible. For instance, both first assembly 102 and second assembly 104 may include respective batteries.

Continuous display 106 may be capable of rendering data into images viewable by a user of device 100. For example, continuous display 106 may include a matrix of pixels that are individually controllable. Examples of continuous display 106 include, but are not limited to, displays having emitting/emissive elements such as light emitting diode (LED) displays, organic light-emitting diode (OLED) displays, micro light-emitting diode (microLED) displays, or similar monochrome or color displays capable of outputting visible information to a user of device 100. Continuous display 106 may span hinge assembly 122 from first assembly 102 to second assembly 104.

In some examples, device 100 may include one or more displays in addition to continuous display 106. For instance, device 100 may include a first additional display on the outer surface of first assembly 102. In some examples, device 100 may further include a second additional display on the outer surface of second assembly 104.

One or more of continuous display 106, the first additional display, and/or the second additional display may be presence-sensitive displays. In some examples, a presence sensitive display may detect an object at and/or near a screen. As one example range, a presence-sensitive display may detect an object, such as a finger or stylus that is within 2 inches of the screen. The presence-sensitive display may determine a location (e.g., an (x,y) coordinate) of a screen at which the object was detected. In another example range, a presence-sensitive display may detect an object within six inches of the screen. Other ranges are also possible. The presence-sensitive display may determine the location of the screen selected by a user's finger using capacitive, inductive, and/or optical recognition techniques. In some examples, the presence sensitive display also provides output to a user using tactile, audio, or video stimuli.

A display assembly may include a display and a display flex that carries various components that support the display. For instance, display assembly 105 may include continuous display 106 and display flex 108. Display flex 108 may include a rigid circuit board that is connected to continuous display 106 via a flexible circuit board that folds approximately 180 degrees (e.g., allowing display flex 108 to be folded behind continuous display 106). Example components that may be included in display flex 108 include, but are not limited to, integrated circuits (ICs) such as a touch integrated circuit, display power management integrated circuit, and a display driver integrated circuit (DDIC). Including such components in display flex 108 may be advantageous (e.g., as such positioning may reduce a distance between the ICs and continuous display 106, thereby reducing signal propagation time). However, it may also be desirable to reduce a size of display flex 108, such as to enable an increase in a size of other components such as battery 110.

In accordance with one or more aspects of this disclosure, display flex 108 may be a multi-segment display flex that includes a plurality of rigid circuit boards folded over on each other. For instance, display flex 108 may include a first rigid circuit board (e.g., a first segment) connected to continuous display 106 via a first flexible circuit board and a second rigid circuit board (e.g., a second segment) connected to the first rigid circuit board via a second flexible circuit board. The first rigid circuit board may be folded back behind continuous display 106 and the second rigid circuit board may be folded back behind the first rigid circuit board. By including such a multi-segment display flex, one or both of a Y-dimension of display flex 108 may be decreased and/or a space available on display flex 108 for mounting ICs may be increased. In this way, aspects of this disclosure may enable an increase in a size of battery 110 or an increase in a quantity of ICs that may be carried by display flex 108.

While described with reference to folding devices, aspects of this disclosure (e.g., multi-segment display flex) can also be used in non-folding devices. For instance, a display assembly of a non-foldable device may include a multi-segment display flex.

Figures 2A, 2B:
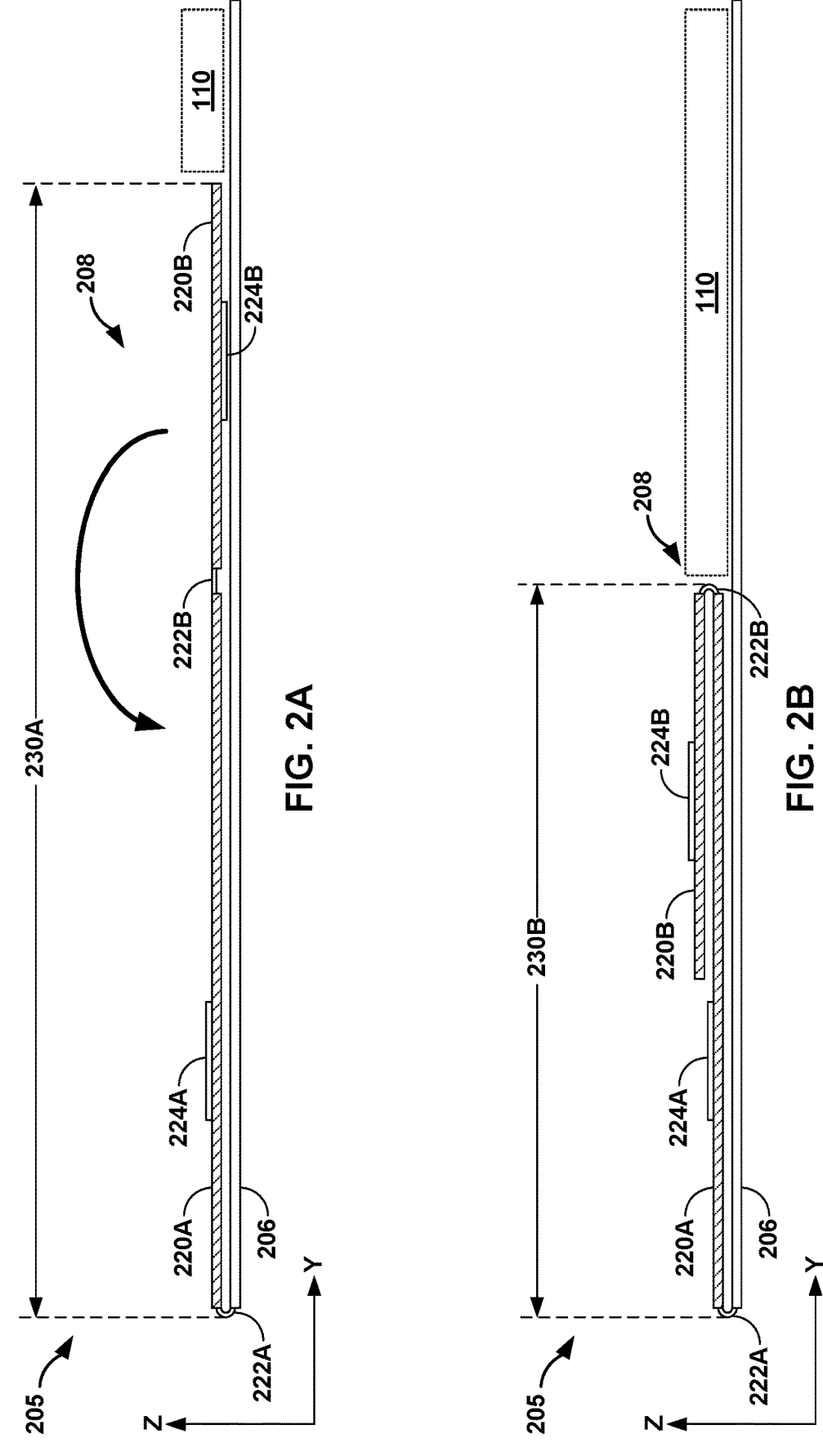
FIGS. 2A and 2B are schematic drawings of a display assembly that includes a multi-segment display flex, in accordance with one or more aspects of this disclosure.

FIGS. 2A and 2B are schematic drawings of a display assembly that includes a multi-segment display flex, in accordance with one or more aspects of this disclosure. Display assembly 205 may include display 206 and display flex 208. Display assembly 205, display 206, and display flex 208 of FIGS. 2A and 2B may be examples of display assembly 105, continuous display 106, and display flex 108 of FIGS. 1A and 1B.

As shown in FIGS. 2A and 2B, display flex 208 may include rigid circuit boards 220A and 220B (collectively, "rigid circuit boards 220"), flexible circuit boards 222A and 222B (collectively, "flexible circuit boards 222"), and ICs 224A and 224B (collectively, "ICs 224"). FIG. 2A illustrates display flex 208 in an unfolded configuration, and FIG. 2B illustrates display flex 208 in a folded configuration (e.g., in which rigid circuit board 220B is folded over rigid circuit board 220A in the direction of the arrow on FIG. 2A).

Each of rigid circuit boards 220 may carry various circuit components. For instance, rigid circuit board 220A may carry first circuit components and rigid circuit board 220B may carry second circuit components. One or both of the first and second circuit components may include an IC of ICs 224. ICs 224 may include one or more of a touch integrated circuit, display power management integrated circuit, and a display driver integrated circuit (DDIC). In one specific example, the rigid circuit board connected to the display may carry the DDIC (e.g., rigid circuit board 220A may carry IC 224A, which may be the DDIC).

Flexible circuit boards 222 may be interspersed between other components of display flex 208 and may be flexible to allow said other components to remain in electrical communication while folding relative to each other. For instance, flexible circuit board 222A may be connected to both display 206 and rigid circuit board 220A, and flexible circuit board 222B may be connected to both rigid circuit board 220A and rigid circuit board 220B. Each of flexible circuit boards 222 may include electrical conductors (e.g., traces) that carry multiple signals between the connected components. For instance, flexible circuit board 222A may include conductors that carry electrical signals between display 206 and rigid circuit board 220A.

Flexible circuit boards 222 may be considered flexible in that they may substantially bend without breaking. By contrast, rigid circuit boards 220 may not substantially bend without breaking.

Flexible circuit boards 222 may be mounted to the connected components via any suitable technique. For example, flexible circuit board 222A may be mounted to one or both of display 206 and/or rigid circuit board 220A via an anisotropic conductive adhesive (ACA), such as anisotropic conductive film (ACF) or anisotropic conductive paste (ACP). The use of ACA may require a "keep out" area around a joint between a flexible circuit board and another component connected to the flexible circuit board. In general, it is not possible to located certain components, such as ICs, within the keep out area of an ACA joint. As discussed in further detail below; the multi-segment aspect of this disclosure may enable ICs to be located within such a keep out area as the IC may be on a circuit board that is folded into the keep out area after the ACA joint is formed.

As discussed above, the multi-segment aspect of this disclosure may provide various advantages. For instance, as shown in FIGS. 2A and 2B, aspects of this disclosure may enable a reduction in a size of display flex 208 (e.g., reduction in Y-dimension from 230A to 230B). Such a reduction in size of display flex 208 may enable an increase in a size of a battery, such as battery 110 of FIGS. 1A and 1B (shown in FIGS. 2A and 2B with dashed lines).

Figures 3A, 3B:
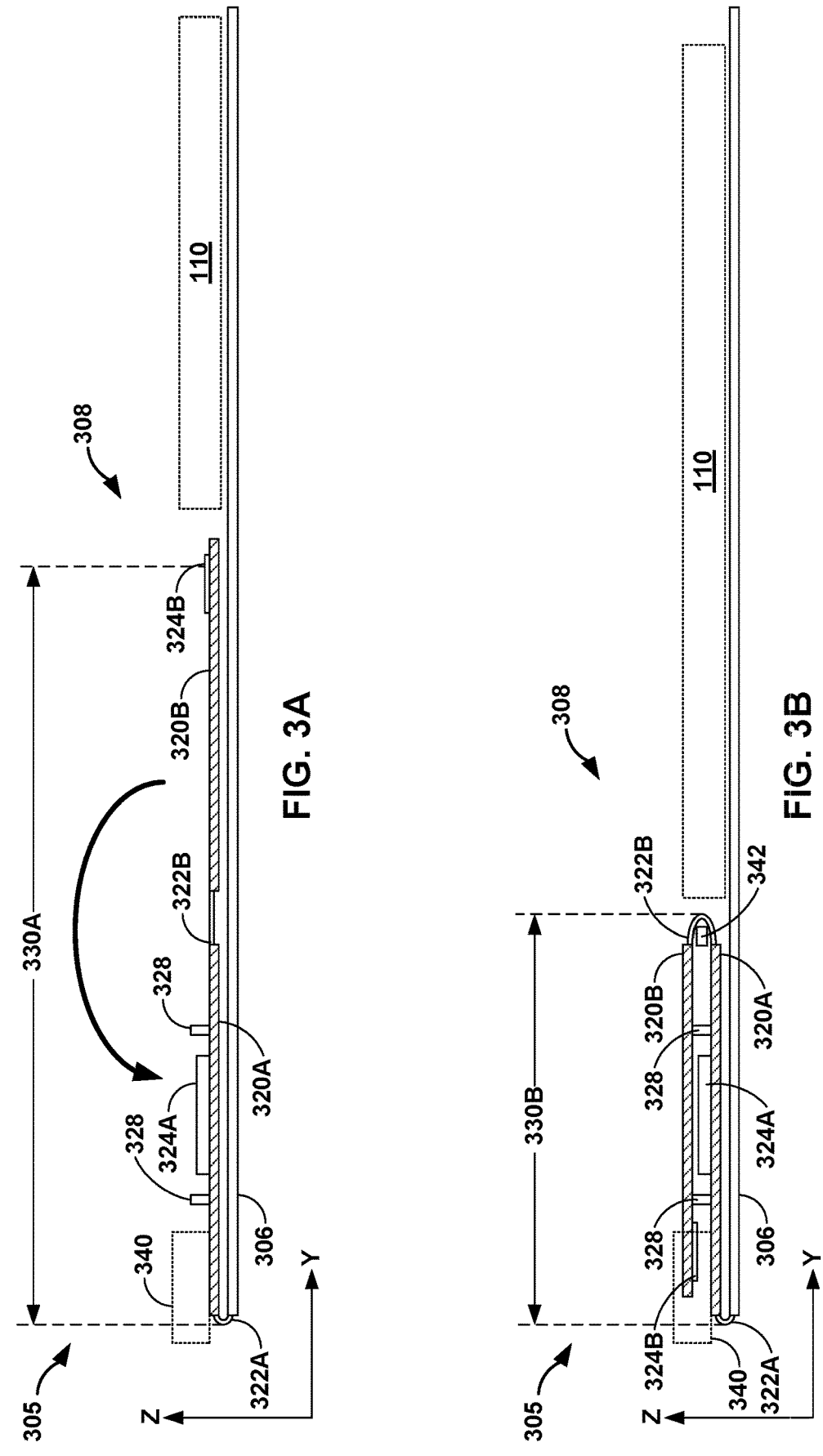
FIGS. 3A and 3B are schematic drawings of a display assembly that includes a multi-segment display flex, in accordance with one or more aspects of this disclosure.

FIGS. 3A and 3B are schematic drawings of a display assembly that includes a multi-segment display flex, in accordance with one or more aspects of this disclosure. Display assembly 305 may include display 306 and display flex 308. Display assembly 305, display 306, and display flex 308 of FIGS. 3A and 3B may be examples of display assembly 205, continuous display 206, and display flex 208 of FIGS. 2A and 2B. Similarly, rigid circuit boards 320A and 320B, flexible circuit boards 322A and 322B, ICs 324A and 324B of FIGS. 3A and 3B may be examples of rigid circuit boards 220A and 220B, flexible circuit boards 222A and 222B, ICs 224A and 224B of FIGS. 2A and 2B. FIG. 3A illustrates display flex 308 in an unfolded configuration, and FIG. 3B illustrates display flex 308 in a folded configuration (e.g., in which rigid circuit board 320B is folded over rigid circuit board 320A in the direction of the arrow on FIG. 3A).

As discussed above, the multi-segment display flex of this disclosure may enable an IC to be positioned within an ACA keep out volume. For instance, as shown in FIGS. 3A and 3B, an ACA joint between flexible circuit board 322A and rigid circuit board 320A may result in keep out area 340. While no ICs may be located in keep out area 340 when display flex 308 is unfolded, the ACA joint between flexible circuit board 322A and rigid circuit board 320A may be formed when display flex 308 is unfolded and IC 324B may be subsequently be positioned within keep out area 340 by folding display flex 308. In this way, aspects of this disclosure may provide more flexibility for layout of circuit components on display flex 308.

In some examples, display flex 308 may include one or more components that support rigid circuit boards 320 relative to each other. For example, display flex 308 may include one or more spacers 328. As shown in FIG. 3B, spacers 328 may support rigid circuit board 320B off of rigid circuit board 320A. Spacers 328 may define a cavity between rigid circuit board 320B and rigid circuit board 320A. In some examples, one of more of ICs 324 may occupy the cavity defined by spacers 328, such as IC 324A.

In some examples, one or more of ICs 324 may be relatively thin. However, in some examples, one or more of ICs 324 may be relatively thick. For instance, as shown in FIGS. 3A and 3B, IC 324A may be relatively thick (e.g., as compared to IC 324B). In some scenarios, such as where a relatively thick IC is on a side of a rigid circuit board that will have another rigid circuit board folded over the IC, a length of a flexible circuit board that connects to the two rigid circuit boards may be relatively long. For instance, a length of flexible circuit board 322B may be relatively long to accommodate IC 324A where IC 324A is relatively thick. Such a length of flexible circuit board may be undesirable (e.g., as the flexible circuit board may crease, which may damage electrical conductors of the flexible circuit board).

In accordance with one or more aspects of this disclosure, display flex 308 may include a support component 342, which may be positioned within a bend of one or more of flexible circuit boards 322. For instance, support component 342 may be positioned within a bend of flexible circuit board

322B and may provide structural support for flexible circuit board 322B (e.g., to reduce a risk of creasing). In some examples, support component 342 may be formed by a material that is readily available in manufacturing, such as pressure sensitive adhesive (PSA).

As discussed above, the multi-segment aspect of this disclosure may provide various advantages. For instance, as shown in FIGS. 3A and 3B, aspects of this disclosure may enable a reduction in a size of display flex 308 (e.g., reduction in Y-dimension from 330A to 330B). Such a reduction in size of display flex 308 may enable an increase in a size of a battery, such as battery 110 of FIGS. 1A and 1B (shown in FIGS. 3A and 3B with dashed lines).

In some examples, in addition to or in place of creating a cavity via spacers 328, a cavity may be created via removal of some layers of one or more of rigid circuit boards 320. For instance, one or more layers may be removed from rigid circuit board 320 to create a cavity that enables IC 324A to be recessed down the Z-axis.

Figures 4A, 4B:
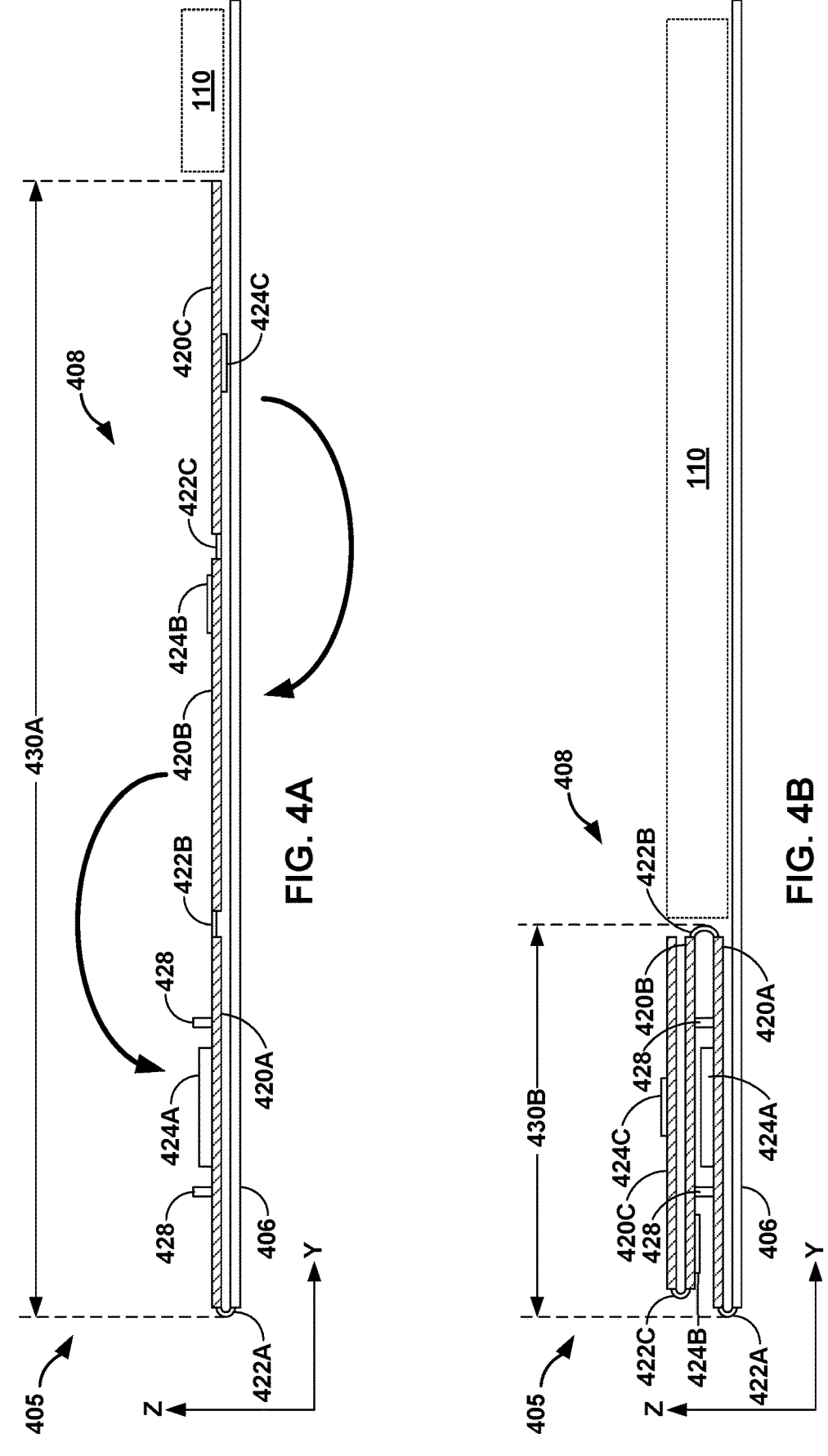
FIGS. 4A and 4B are schematic drawings of a display assembly that includes a multi-segment display flex, in accordance with one or more aspects of this disclosure.

FIGS. 4A and 4B are schematic drawings of a display assembly that includes a multi-segment display flex, in accordance with one or more aspects of this disclosure. Display assembly 405 may include display 406 and display flex 408. Display assembly 405, display 406, and display flex 408 of FIGS. 4A and 4B may be examples of display assembly 305, continuous display 306, and display flex 308 of FIGS. 3A and 3B. Similarly, rigid circuit boards 420A and 420B, flexible circuit boards 422A and 422B, ICs 424A and 424B, and spacers 428 of FIGS. 4A and 4B may be examples of rigid circuit boards 320A and 320B, flexible circuit boards 322A and 322B, ICs 324A and 324B, and spacers 328 of FIGS. 3A and 3B. FIG. 4A illustrates display flex 408 in an unfolded configuration, and FIG. 4B illustrates display flex 408 in a folded configuration (e.g., in which rigid circuit board 420B is folded over rigid circuit board 420A and rigid circuit board 420C is folded over rigid circuit board 420B in the direction of the arrows on FIG. 4A).

As can be seen in FIGS. 4A and 4B, aspects of this disclosure may be extended to display flexes with more than two rigid circuit boards. For instance, display flex 408 may include three rigid circuit boards 420A, 420B, and 420C. Display flex 408 may include one or more additional flexible circuit boards to connect the rigid circuit boards (e.g., flexible circuit board 422C may connect rigid circuit boards 420B and 420C. As shown in FIGS. 4A and 4B, including more than two rigid circuit boards in display flex 408 may enable inclusion of additional ICs, such as IC 424C on rigid circuit board 420C.

Figure 5A:
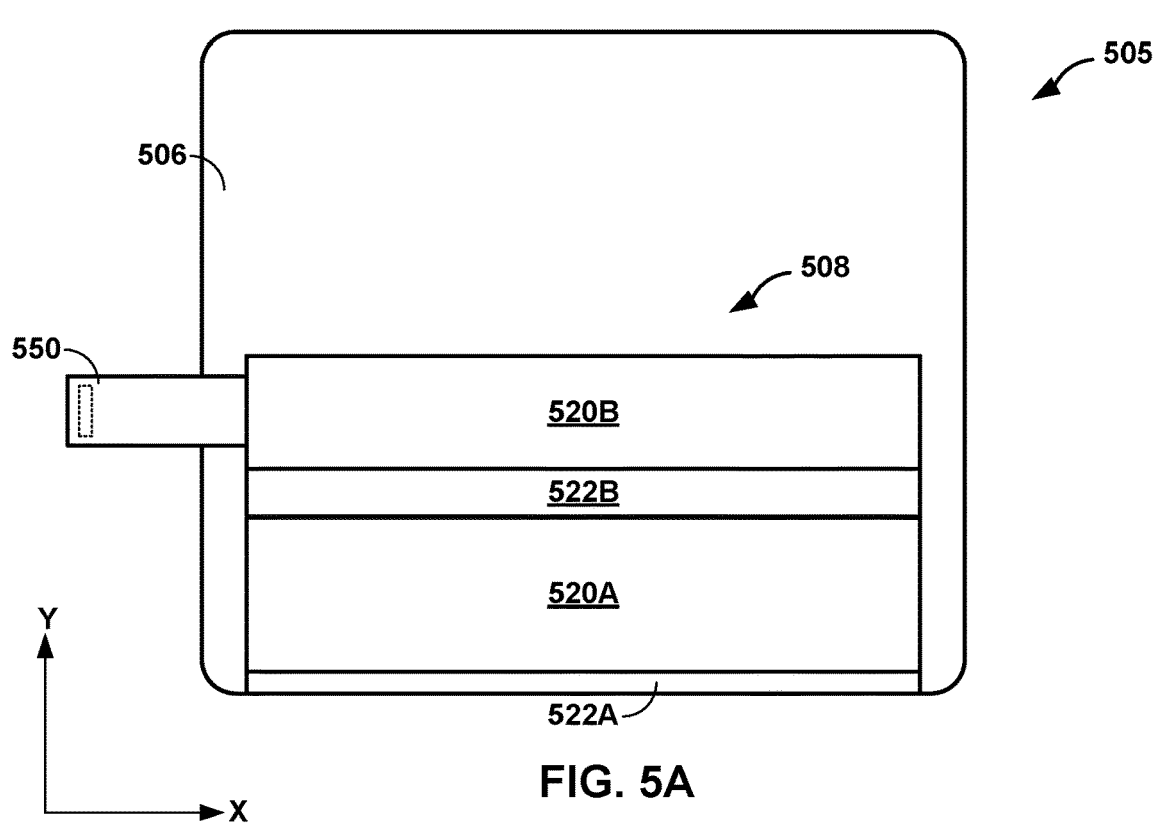
FIGS. 5A and 5B are schematic drawings of a display assembly that includes a multi-segment display flex, in accordance with one or more aspects of this disclosure.
Figure 5B:
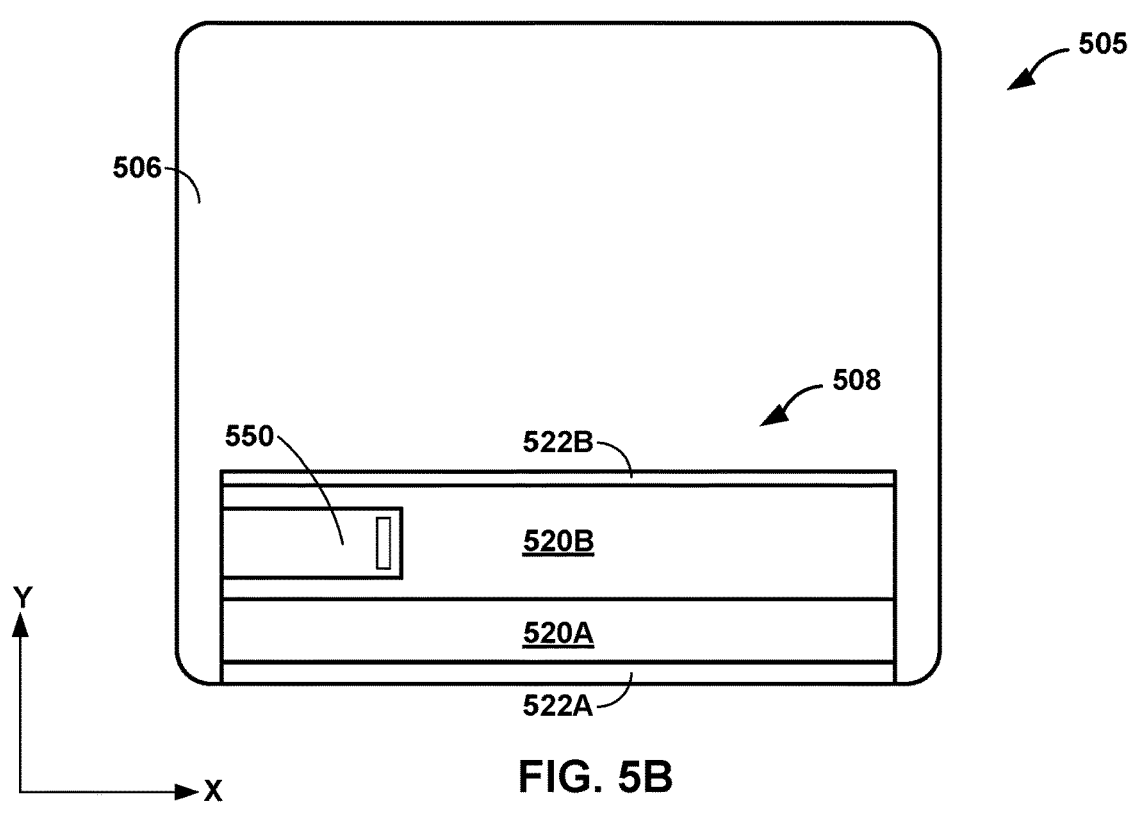

FIGS. 5A and 5B are schematic drawings of a display assembly that includes a multi-segment display flex, in accordance with one or more aspects of this disclosure. Display assembly 505 may include display 506 and display flex 508. Display assembly 505, display 506, and display flex 508 of FIGS. 5A and 5B may be examples of display assembly 205, display 206, and display flex 208 of FIGS. 2A and 2B. Similarly, rigid circuit boards 520A and 520B, and flexible circuit boards 522A and 522B of FIGS. 5A and 5B may be examples of rigid circuit boards 220A and 220B, and flexible circuit boards 222A and 222B of FIGS. 2A and 2B.

As discussed above, the multi-segment aspect of this disclosure may provide various advantages. For instance, as shown in FIGS. 4A and 4B, aspects of this disclosure may enable a reduction in a size of display flex 408 (e.g., reduction in Y-dimension from 430A to 430B). Such a reduction in size of display flex 408 may enable an increase in a size of a battery, such as battery 110 of FIGS. 1A and 1B (shown in FIGS. 4A and 4B with dashed lines).

As shown in FIGS. 5A and 5B, display assembly 505 may include connector 550, which may provide electrical connection between display flex 508 and other components of a computing device that includes display assembly 505. Connector 550 may be formed of a flexible circuit board that may be folded and enable the computing device to be opened (at least partially) with display assembly 505 still connected via connector 550.

Figure 6A:
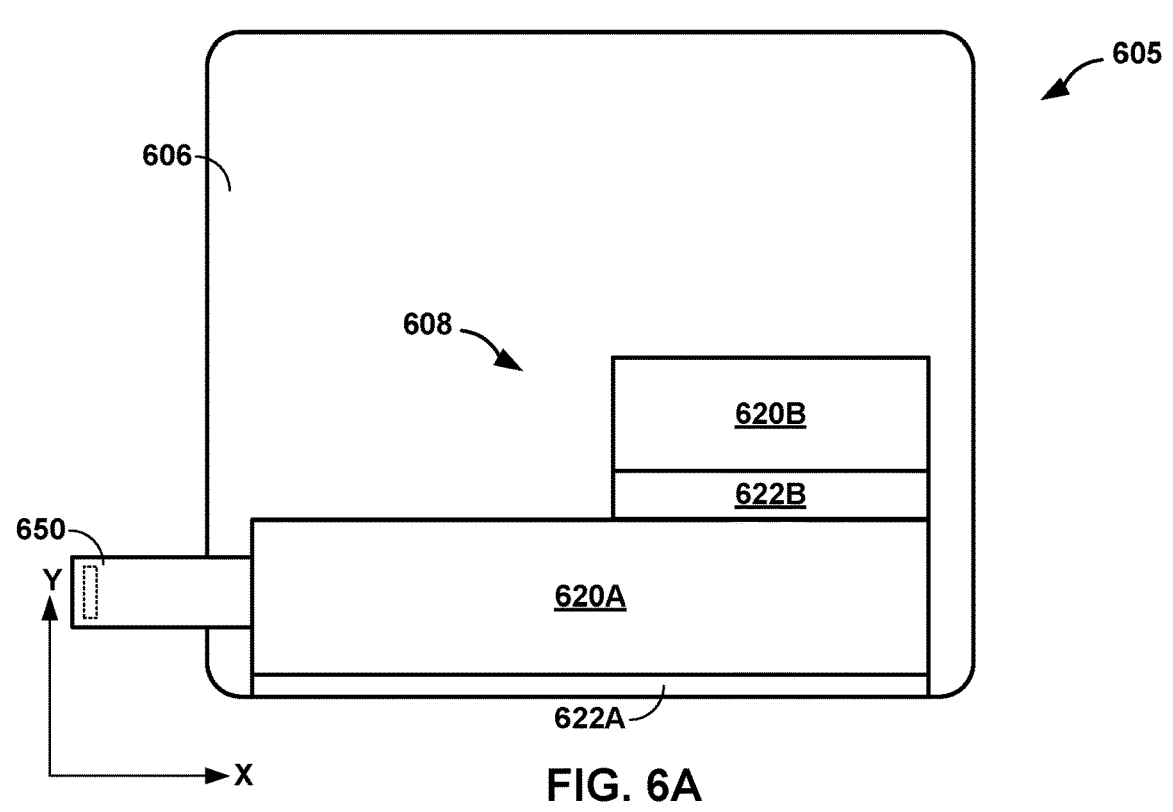
FIGS. 6A and 6B are schematic drawings of a display assembly that includes a multi-segment display flex, in accordance with one or more aspects of this disclosure.
Figure 6B:
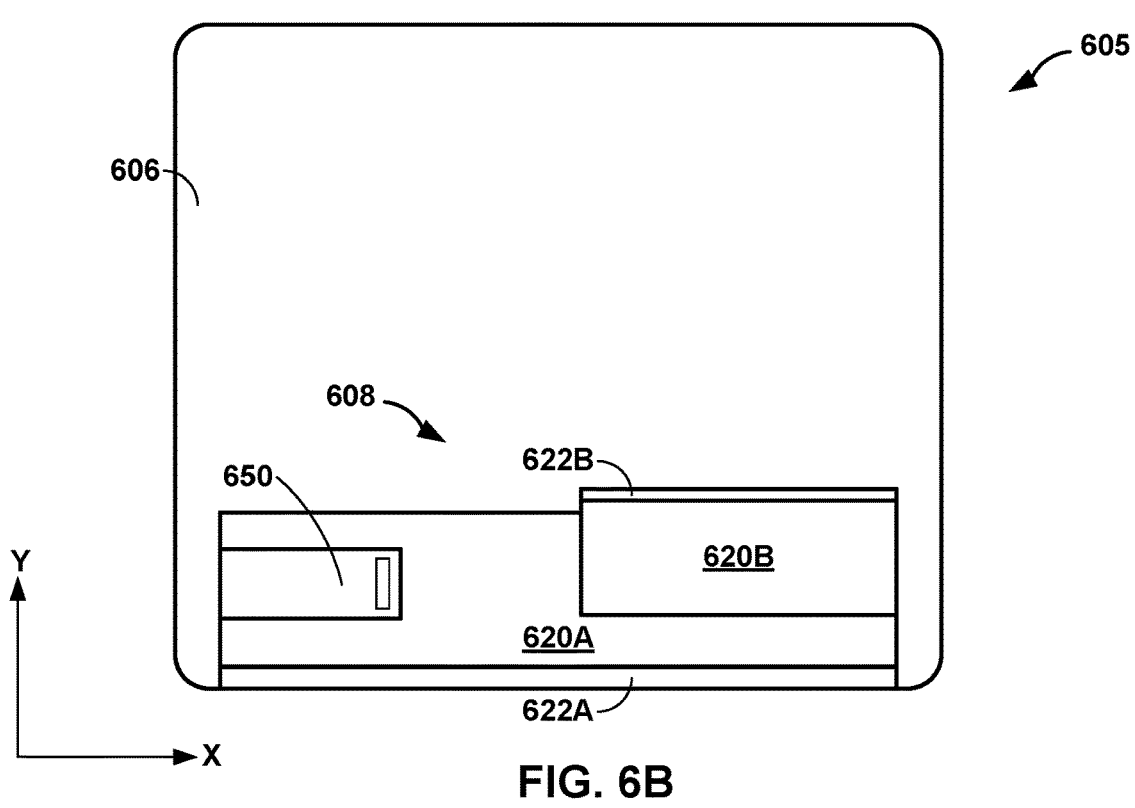

FIGS. 6A and 6B are schematic drawings of a display assembly that includes a multi-segment display flex, in accordance with one or more aspects of this disclosure. Display assembly 605 may include display 606 and display flex 608. Display assembly 605, display 606, and display flex 608 of FIGS. 6A and 6B may be examples of display assembly 505, display 506, and display flex 508 of FIGS. 5A and 5B. Similarly, rigid circuit boards 620A and 620B, flexible circuit boards 622A and 622B, and connector 650 of FIGS. 6A and 6B may be examples of rigid circuit boards 520A and 520B, flexible circuit boards 522A and 522B, and connector 550) of FIGS. 5A and 5B.

In some examples, widths of the rigid circuit boards of a display flex may be about the same (e.g., +/−5% of each other). For instance, in the example of FIGS. 5A and 5B, a width (e.g., in the X-axis) of rigid circuit board 520A may be about equal of a width of rigid circuit board 520B. In some examples, widths of the rigid circuit boards of a display flex may be different. For instance, in the example of FIGS. 6A and 6B, a width (e.g., in the X-axis) of rigid circuit board 620A may be greater than of a width of rigid circuit board 620B. Having a rigid circuit board, in particular a subsequent board in the chain, be smaller may provide various advantages, such as enabling a more consistent depth of display flex (e.g., with connector 650) occupying the volume that would have been occupied by rigid circuit board 620B if it were the same width as rigid circuit board 620A).

The following numbered example may illustrate one or more aspects of this disclosure:

Example 1. A mobile computing device comprising: a display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel: first circuit components mounted to the first rigid circuit board: a second rigid circuit board connected to a second end of the first rigid circuit board via a second flexible printed circuit connection, the second rigid circuit board folded over the first rigid circuit board; and second circuit components mounted to the second rigid circuit board.

Example 2. The mobile computing device of example 1, wherein the first circuit components comprise at least one first integrated circuit component of a plurality of integrated circuit components, and wherein the second circuit components comprise at least one second integrated circuit component of the plurality of integrated circuit components.

Example 3. The mobile computing device of example 2, wherein the plurality of integrated circuit components include one or more of a touch integrated circuit, display power management integrated circuit, and a display driver integrated circuit.

Example 4. The mobile computing device of example 3, wherein the at least one first integrated circuit is the display driver integrated circuit.

Example 5. The mobile computing device of any of examples 2-4, wherein the display assembly further comprises: one or more spacers positioned between the first rigid circuit board and the second rigid circuit board, wherein the at least one first integrated circuit occupies a volume created in between the first rigid circuit board and the second rigid circuit board defined by the one or more spacers.

Example 6. The mobile computing device of any of examples 1-5, wherein a width of the first flexible printed circuit connection is equal to a width of the second flexible printed circuit connection.

Example 7. The mobile computing device of any of examples 1-5, wherein a width of the first flexible printed circuit connection is greater than a width of the second flexible printed circuit connection.

Example 8. The mobile computing device of any of examples 1-7, wherein the first flexible printed circuit connection is attached to the first rigid circuit board via anisotropic conductive adhesive.

Example 9. The mobile computing device of example 8, wherein, when folded, one or both of the second components and the second rigid circuit board are within an anisotropic conductive adhesive keep out area.

Example 10. The mobile computing device of any of examples 1-9, further comprising pressure sensitive adhesive positioned within a fold of the second flexible printed circuit connection.

Example 11. The mobile computing device of any of examples 1-10, further comprising: a housing, wherein the display assembly is attached to the housing; and a battery positioned within the housing, the battery adjacent to the display flex.

Example 12. The mobile computing device of example 11, wherein the mobile computing device is a folding mobile computing device, wherein the housing is a first housing, wherein the folding mobile computing device further comprises a second housing hingedly connected to the first housing, and wherein the display panel comprises a flexible display panel that spans the first housing and the second housing.

Example 13. A display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel: first circuit components mounted to the first rigid circuit board; a second rigid circuit board connected to a second end of the first rigid circuit board via a second flexible printed circuit connection, the second rigid circuit board folded over the first rigid circuit board; and second circuit components mounted to the second rigid circuit board.

Various aspects have been described in this disclosure. These and other aspects are within the scope of the following claims.

The invention claimed is:

1. A mobile computing device comprising: a display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel; first circuit components mounted to the first rigid circuit board; a second rigid circuit board connected to a second end of the first rigid circuit board via a second flexible printed circuit connection, the second rigid circuit board folded over the first rigid circuit board such that the first rigid circuit board is sandwiched between the second rigid circuit board and the display panel; second circuit components mounted to the second rigid circuit board; a housing, wherein the display assembly is attached to the housing; and a battery positioned within the housing, the battery adjacent to the display flex and overlying a different portion of the display panel than the display flex.

2. The mobile computing device of claim 1, wherein the first circuit components comprise at least one first integrated circuit component of a plurality of integrated circuit components, and wherein the second circuit components comprise at least one second integrated circuit component of the plurality of integrated circuit components.

3. The mobile computing device of claim 2, wherein the plurality of integrated circuit components include one or more of a touch integrated circuit, display power management integrated circuit, and a display driver integrated circuit.

4. The mobile computing device of claim 3, wherein the at least one first integrated circuit is the display driver integrated circuit.

5. The mobile computing device of claim 2, wherein the display assembly further comprises:

one or more spacers positioned between the first rigid circuit board and the second rigid circuit board, wherein the at least one first integrated circuit occupies a volume created in between the first rigid circuit board and the second rigid circuit board defined by the one or more spacers.

6. The mobile computing device of claim 1, wherein a width of the first flexible printed circuit connection is equal to a width of the second flexible printed circuit connection.

7. The mobile computing device of claim 1, wherein a width of the first flexible printed circuit connection is greater than a width of the second flexible printed circuit connection.

8. The mobile computing device of claim 1, wherein the first flexible printed circuit connection is attached to the first rigid circuit board via anisotropic conductive adhesive.

9. The mobile computing device of claim 8, wherein, when folded, one or both of the second circuit components and the second rigid circuit board are within an anisotropic conductive adhesive keep out area of the anisotropic conductive adhesive attaching the first flexible printed circuit connection to the first rigid circuit board.

10. The mobile computing device of claim 1, further comprising pressure sensitive adhesive positioned within a fold of the second flexible printed circuit connection.

11. The mobile computing device of claim 1, further comprising:

a housing, wherein the display assembly is attached to the housing; and a battery positioned within the housing, the battery adjacent to the display flex.

12. The mobile computing device of claim 11, wherein the mobile computing device is a folding mobile computing device, wherein the housing is a first housing, wherein the folding mobile computing device further comprises a second housing hingedly connected to the first housing, and wherein the display panel comprises a flexible display panel that spans the first housing and the second housing.

13. A display assembly comprising: a display panel that includes light emitting elements; and a display flex comprising: a first rigid circuit board connected to the display panel via a first flexible printed circuit connection at a first end of the first rigid circuit board, the first rigid circuit board folded over the display panel; first circuit components mounted to the first rigid circuit board; a second rigid circuit board connected to a second end of the first rigid circuit board via a second flexible printed circuit connection, the second rigid circuit board folded over the first rigid circuit board such that the first rigid circuit board is sandwiched between the second rigid circuit board and the display panel; second circuit components mounted to the second rigid circuit board; a housing, wherein the display assembly is attached to the housing; and a battery positioned within the housing, the battery adjacent to the display flex and overlying a different portion of the display panel than the display flex.

\* \* \* \* \*